Sept. 1, 1925.  
A. NOSCHESE  
1,551,841  
DIAGRAM SHEET AND METHOD OF ORIENTING DIAGRAM SHEETS  
Filed Aug. 5, 1920  3 Sheets-Sheet 1

Albert Noschese  
Inventor  
By George Ramsey  
Attorney

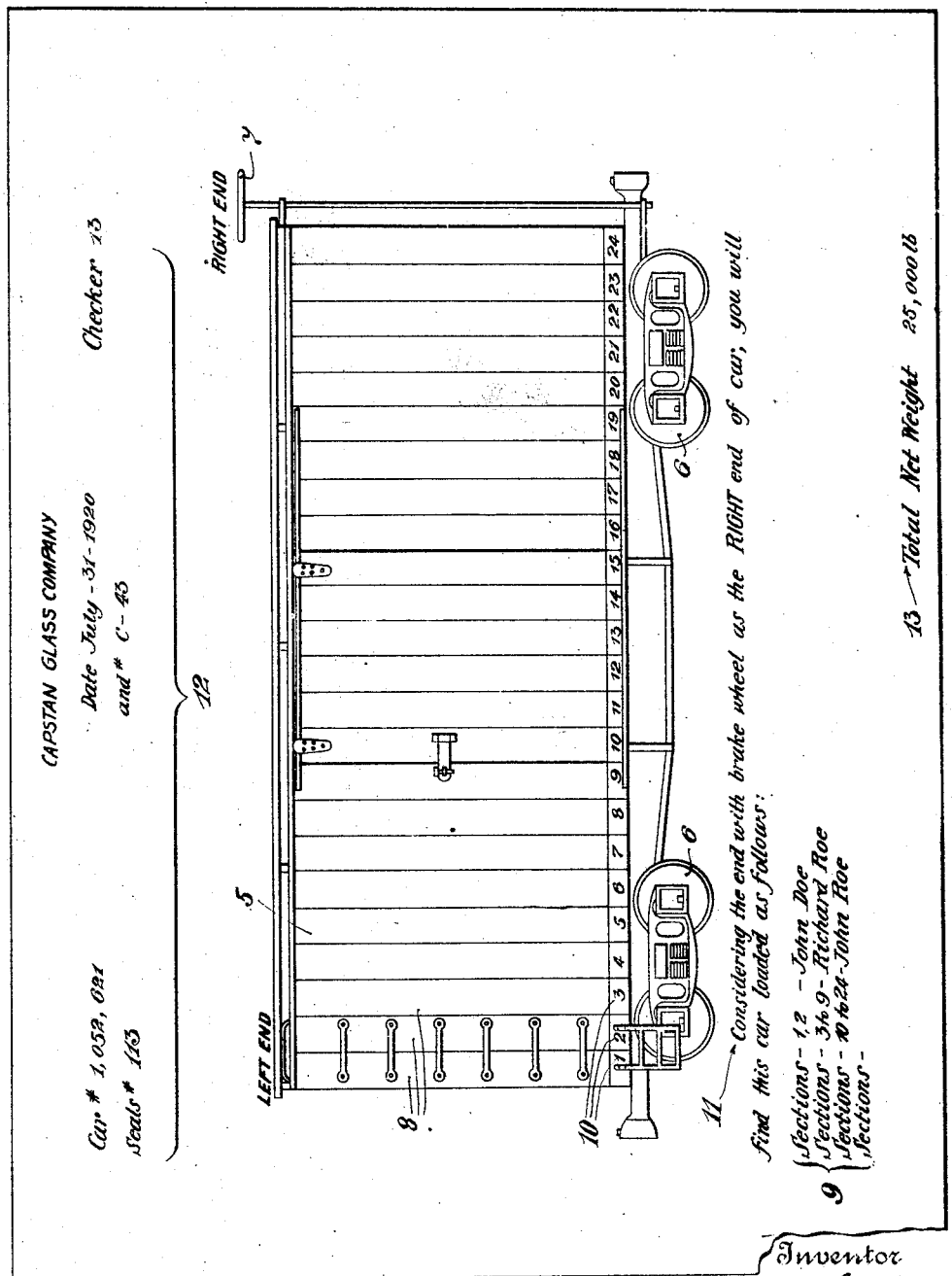

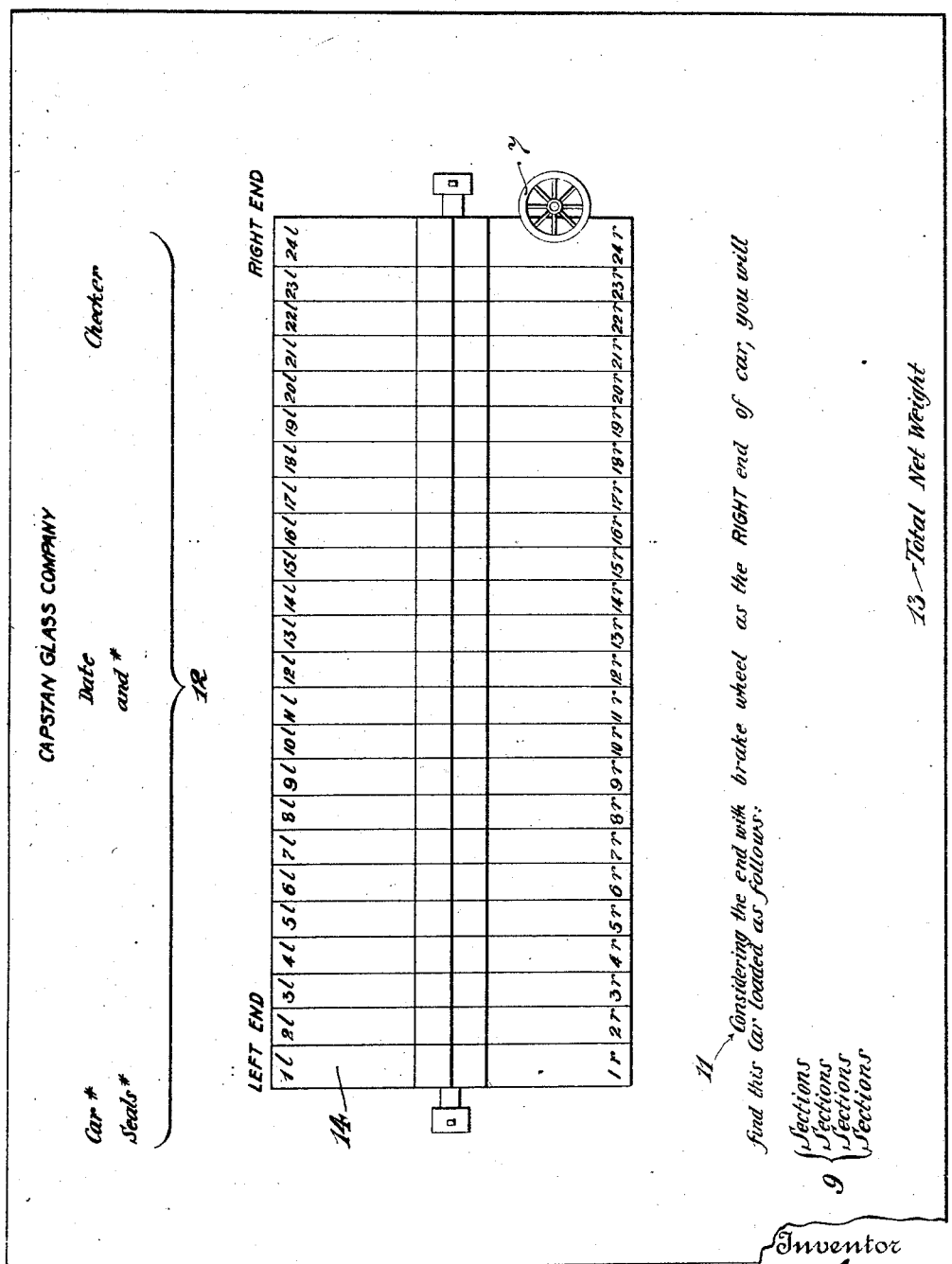

Patented Sept. 1, 1925.

1,551,841

UNITED STATES PATENT OFFICE.

ALBERT NOSCHESE, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

DIAGRAM SHEET AND METHOD OF ORIENTING DIAGRAM SHEETS.

Application filed August 5, 1920. Serial No. 401,427.

*To all whom it may concern:*

Be it known that I, ALBERT NOSCHESE, a citizen of the United States, and a resident of Connellsville, in the county of Fayette, State of Pennsylvania, have invented new and useful Improvements in Diagram Sheets and Methods of Orienting Diagram Sheets, of which the following is a specification.

The present invention relates to a diagram sheet and method of orienting such sheets.

The general object of the present invention is the provision of a diagram sheet by reference to which a freight car or the like may be loaded, and on which the distribution of goods within the car can be readily indicated with certainty and definiteness.

An equally important object of the invention is to eliminate ambiguity in a loading diagram for a freight car or the like, caused by symmetry of the loading space.

Another object of the invention is the provision of an improved loading sheet for a freight car or the like, which is adapted to have the distribution of loaded goods marked thereon and which may be disassociated from the loading space without introducing any ambiguity into the indicated distribution.

A further object of the invention is the provision of a method of orienting a loading sheet having a symmetrical representation of the loading space of a freight car, whereby ambiguity due to the symmetry of the loading space is removed.

A more specific object of the invention is the provision of a method of orienting a loading sheet for a freight car or the like, which method permits the loading sheet to be disassociated from the load without introducing ambiguity into the diagram of the load.

Other and further objects of the present invention will in part be obvious and will in part be pointed out hereinafter by reference to the accompanying drawings wherein like parts are represented by like characters throughout the several figures thereof.

Realizing the present invention may be carried out and practiced by devices and methods other than those specifically herein disclosed, it is desired that the present disclosure shall be considered as illustrative and not in the limiting sense.

Figure 2 illustrates a diagram sheet in accordance with the present invention representing an elevation or side view of a freight car as the basis of the diagram;

Figure 3 is a view of a diagram sheet using the plan of a freight car as the basis of the diagram, and illustrating the sections as being both longitudinal and transverse of the car.

Figure 1:
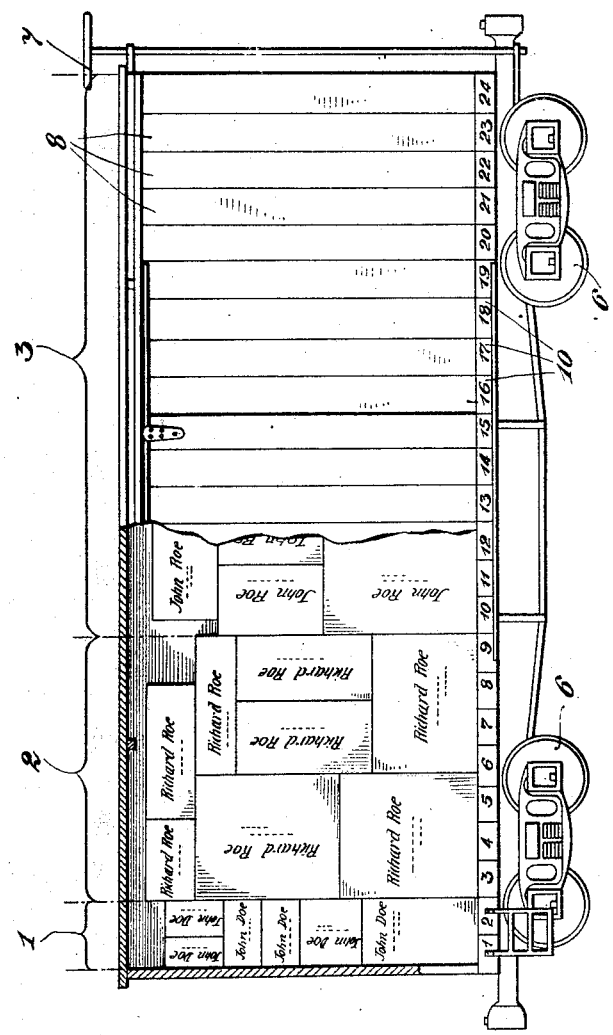
Figure 1 is an elevational view of a partly loaded box-car with a portion of the car side broken away to indicate the goods in the car.

Heretofore in the art, it has been customary to load vehicles for transportation or storage of goods such as freight cars, ships, etc. without particular reference to the location of the goods in the loading room or chamber other than the convenience of arranging the goods to facilitate the personal desires of the workmen during the loading. Where the freight room of a car or ship has been loaded with goods comprising "mixed shipments" the best practice has been to group the goods for a single consignee or for a single designation, in order to facilitate transfer of the goods at the terminal or transport points. The grouping of transportable material or matter is carried to a considerable degree in the U. S. railway mail cars. It frequently happens that manufacturers making a standard line of goods adapted to be packaged in packages of a definite standard size ship "mixed shipments" wherein the goods are packed more or less heterogeneously in a box-car or the like and a consignee of the "mixed shipment" at a way station must search through the car until the particular goods are found. The same condition occurs where "mixed shipments" are sent to a designated terminal or point for re-distribution from that point, and where it is desired to get at certain groups or characters of goods before other groups or characters of goods. In finding a particular shipment in a carload of goods it is necessary to move other goods in the car and the result of that is further mixing of the contents of the car until at the end of its destination or at the terminal the goods are badly confused.

The present invention overcomes the difficulties of the prior art by means of an oriented diagram sheet having a representation of the loading space of a freight car or the like. The loading space being symmetrical and ambiguity would be introduced on disassociating the diagram from the car to which it referred, unless the diagram were oriented. Freight cars are provided with a brake wheel on only one end of the car, and in accordance with the present invention the diagram is oriented by marking one end of the diagram to correspond with the end of the car having a brake wheel or other distinctive structural feature. This marking may be by suitable printing placed upon the sheet at the time the representation of the loading space of the freight car or the like is printed.

The representation of the car is divided into sections and when the car is loaded the goods are grouped, e. g. as to character of the goods, consignees, destination, etc., and are loaded with reference to the diagram. As the goods are loaded the arrangement of the goods is recorded on one or more loading diagrams by suitable notations made on the various sections of the diagrams. One such diagram of the loading of the car may be mailed or otherwise sent to each consignee or other person who will desire to know the location of goods therein.

Figure 1 illustrates a portion of the car with the side broken away and showing goods in group 1 being addressed for a common consignee, and the goods in group 2 addressed to a different consignee. These goods are all grouped in one portion of the car or the like and each portion may be designated on the diagram as hereinafter specified.

Referring to Figure 2, the diagram represents a pictorial elevation of a box car 5 provided with the usual trucks 6 and the brake wheel 7. The car is divided into arbitrary sections 8 and a portion of the diagram sheet 9 is provided to indicate the particular sections in which the goods are to be loaded. It will be noted that the sections 8 are represented by designating numerals 10, which numerals begin at the opposite end from the brake wheel 7. It therefore follows that when the instructions 11 on the diagram are considered the consignee is fully informed as to the method of reading the diagram. Preferably a portion of the diagram, as at 12, is provided with spaces for designating the car, seals, date of shipment, etc. Another portion of the diagram 13 is provided to indicate the total weight.

Figure 3 is a diagram which is exactly similar to the diagram shown in Figure 2, with the exception that the representation of the car in Figure 3 is a plan view and the car is arbitrarily divided longitudinally into two groups of sections, thereby making an additional group 14 which may be designated by suitable designating characters such as lettering the numbered sections. The particular arrangement of the sections is unimportant so long as it shall be predetermined so that the goods when loaded may be indicated on the diagram in accordance with the sections into which the car or ship is arbitrarily divided.

From the foregoing it will be clear that by means of the diagram sheet, goods in a storehouse or freight vehicle may be immediately located by one other than the loader, thereby greatly facilitating the removal of the goods when desired.

The diagram being oriented by having the end marked which corresponds to the brake wheel or the like there is no ambiguity even though it may have been disassociated from the car.

I claim:

1. A freight car loading card comprising a sheet of material, an outline printed on said sheet to represent the loading space of a freight car, lines printed on said card to subdivide the loading space into sections, and printing on said card to designate one end of the loading space as the brake wheel end of the car.

2. The method of orienting a loading card having a symmetrical representation of the loading space of a freight car which comprises marking one end of the representation to correspond with the brake wheel end of the car.

ALBERT NOSCHESE.